United States Patent
Nandy et al.

(10) Patent No.: US 12,445,368 B2
(45) Date of Patent: Oct. 14, 2025

(54) HARDWARE OFFLOAD OF MULTICAST CONTROL PLANE FUNCTIONS

(71) Applicant: Hewlett Packard Enterprise Development LP, Spring, TX (US)

(72) Inventors: Tathagata Nandy, Bengaluru (IN); Anil Raj, Bengaluru (IN); Priyam De, Bengaluru (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 328 days.

(21) Appl. No.: 18/358,672

(22) Filed: Jul. 25, 2023

(65) Prior Publication Data

US 2025/0039080 A1    Jan. 30, 2025

(51) Int. Cl.
*H04L 45/16* (2022.01)
(52) U.S. Cl.
CPC .................................. *H04L 45/16* (2013.01)
(58) Field of Classification Search
CPC .......................................................... H04L 45/16
See application file for complete search history.

(56) References Cited

U.S. PATENT DOCUMENTS

| | | | | |
|---|---|---|---|---|
| 8,339,973 B1* | 12/2012 | Pichumani | .............. | H04L 43/10 370/248 |
| 2013/0329727 A1* | 12/2013 | Rajagopalan | ....... | H04L 12/4641 370/390 |
| 2021/0036952 A1* | 2/2021 | Pattabhiraman | ...... | H04L 63/101 |

\* cited by examiner

*Primary Examiner* — Walli Z Butt
(74) *Attorney, Agent, or Firm* — Yao Legal Services, Inc.

(57) ABSTRACT

One aspect can provide a system and method for tunnel-based multicasting. During operation, a source-side designated router (DR) coupled to a source device of a multicast group can broadcast a service-advertisement packet and receive a response packet from a client-side DR coupled to one or more client devices within the multicast group. The source-side DR can determine an address of the client-side DR based on the received response packet and establish a hardware-based communication tunnel between the source-side DR and the client-side DR using the address of the client-side DR. Establishing the hardware-based communication tunnel can include using hardware logic units to encapsulate multicast data packets originating from the source device. The source-side DR can further send, over the hardware-based communication tunnel, multicast data packets originating from the source device to the client-side DR, which forwards the multicast data packets to the client devices within the multicast group.

20 Claims, 6 Drawing Sheets

HARDWARE OFFLOAD OF MULTICAST CONTROL PLANE FUNCTIONS

BACKGROUND

Field

This disclosure is generally related to multicast networks. More specifically, this disclosure is related to improving the performance of a multicast network by offloading certain control plane functions to hardware.

BRIEF DESCRIPTION OF THE FIGURES

In the figures, like reference numerals refer to the same figure elements.

DETAILED DESCRIPTION

Figure 1:
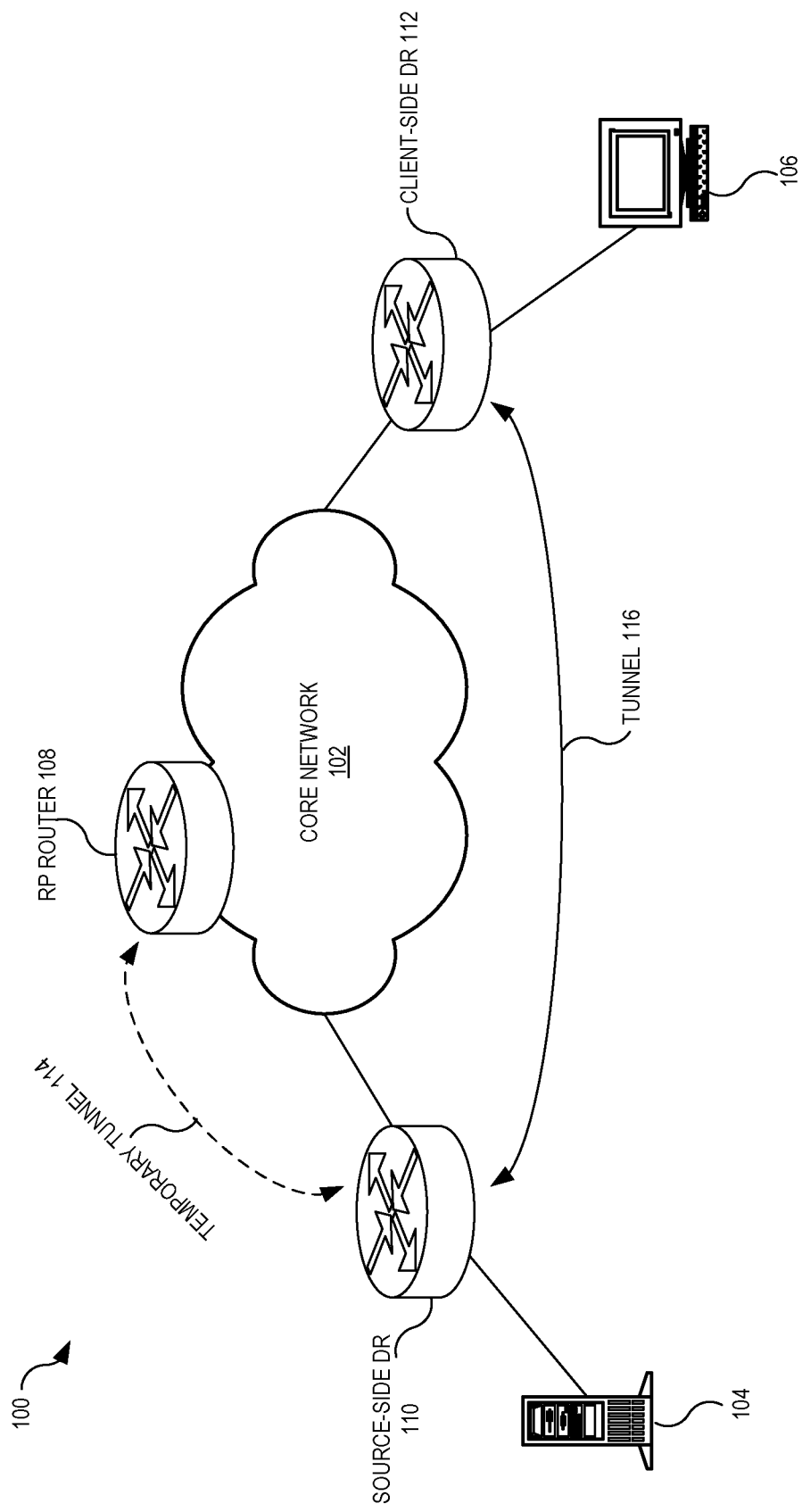
FIG. 1 illustrates an example of a multicast network, according to one aspect of the instant application.

Multicast allows data to be sent from a single source to multiple destinations simultaneously. Multicast data is only sent once but can be received by multiple endpoints that have subscribed to a specific multicast group. Essentially, multicast distributes the stream of data to multiple recipients without creating separate streams for each destination. Multicast can conserve network bandwidth and reduce the overall network traffic. Multicast is commonly used for delivering streaming media, Internet Protocol television (IPTV), Voice over Internet Protocol (VoIP), and video conferencing. Compared with unicast communication, multicast communication requires specialized network hardware and protocols to function properly.

Like unicast communications, multicast communications rely on both the control plane functions and the data plane functions of the router to route packets. The control plane functions can include building and updating the multicast routing table based on the multicast protocol (e.g., the Protocol Independent Protocol (PIM)). The data plane functions can include processing the data requests, such as forwarding packets to the appropriate ports. The control plane operations can also be referred to as the "slow path," where system states are built using software running on a specialized operating system (i.e., the network operating system (OS)). Multiple applications, including the multicast application, may run in the control plane and can load the CPU of the control plane. To route packets in the network, the control plane of a router can build its internal state (e.g., the routing table) within the network and then program the packet-forwarding hardware (e.g., the Application Specific Integrated Circuits (ASICs)) for data forwarding.

A number of control-plane and data-plane operations can be performed to achieve multicast communications. For a standard multicast protocol (e.g., the PIM), the control plane operations performed by a router can include exchanging neighbor information with its peers and building adjacencies. Performing such operations can include exchanging special neighbor-discovery messages (e.g., the HELLO messages) with its peers. Once the adjacencies among neighbors are formed, the neighbors can also send messages specific to the particular protocol, such as the JOIN/PRUNE messages in the Internet Group Management Protocol (IGMP), toward the multicast source. Such operations can lead to state formation (e.g., building the multicast routing table) in each node on the multicast path. At this point, the packet-forwarding hardware or ASIC is not yet programmed to forward multicast data packets. When the actual multicast data packets are received at a node, a flow-miss event will occur, as the packet-forwarding ASIC is not yet programmed. The flow-miss event can trigger the control plane software to program the hardware states in the packet-forwarding ASIC (e.g., by configuring the hardware-based forwarding table). The above operations are control plane operations and can be referred to as slow-path programming or operation because programming the hardware states can be time-consuming.

Once the hardware states in the packet-forwarding ASIC are programmed, subsequent flows (e.g., multicast data packets) matching the programmed hardware states can be forwarded toward their destinations at the line rate (i.e., at the rate the traffic arrives at the router without processing delays). Such a packet-forwarding operation is called fast-path operation. Before the fast-path data forwarding can occur, each router on the multicast path needs to perform the slow-path operation, i.e., program the hardware states of their ASICs. Programming the hardware by the control plane can take time, which can increase the latency of the multicast traffic. To reduce the latency, according to some aspects, certain multicast control plane functions of the routers can be offloaded to hardware. More specifically, many routers already have hardware logic units used for tunneling, and the proposed offload solution can take advantage of the existing hardware tunnel logic to speed up the multicast control plane functions.

FIG. 1 illustrates an example of a multicast network, according to one aspect of the instant application. In FIG. 1, a multicast network 100 can include a core network 102, a number of routers coupled to core network 102, a multicast source server 104, and a client device 106. Core network 102 can be any type of network, such as an Internet protocol (IP) network. Multicast source server 104 is the sender of multicast data packets, and client device 106 is the receiver of the multicast data packets. In one example, multicast source server 104 can be an IPTV server, and client device 106 can be a smart TV.

In a multicast network implementing PIM-Sparse Mode (SM), different routers may have different roles and provide different multicast services. In the example shown in FIG. 1, multicast network 100 can include a Rendezvous Point (RP) router 108, a source-side designated router (DR) 110, and a client-side DR 112. RP router 108 can function as a shared meeting point for multicast traffic. More specifically, multicast sources (e.g., source server 104) are required to send their traffic to RP router 108, and RP router 108 can forward the multicast traffic to receivers (e.g., client device 106). Depending on the implementation, RP router 108 can be configured statically (e.g., by configuring the RP address as the address of RP router 108 on every router in the multicast group) or dynamically (e.g., by dynamically selecting an RP router from a group of candidate RP routers).

According to the PIM-SM protocol, the source-side DRs can be responsible for sending PIM register messages to RP router 108 by creating a temporary tunnel to RP router 108 (e.g., by encapsulating the initial multicast packet from the source in a PIM register message with the destination address set as the IP address of RP router 108). The client-side DR can be responsible for sending join messages toward RP router 108 to allow the discovery of intermediate routers on the path. In the example shown in FIG. 1, when client device 106 wishes to join a multicast group G, it can inform client-side DR 112, which can send a join message to RP router 108. Intermediate routers along the path can form a rendezvous point tree (RPT) branch. When source server 104 starts multicasting, it can send an initial multicast data packet to source-side DR 110, which can register with RP router 108 (or inform RP router 108 of its presence) by creating a temporary tunnel 114 to send the initial multicast data packet to RP router 108. RP router 108 can receive the register message, decapsulate the register message, and forward the initial multicast data packet down to the RPT. RP router 108 can also send a join message toward source server 104. Routers along the path from RP router 108 to source-side DR 110 can form a shortest-path tree (SPT) branch. The SPT and RPT together can form the actual multicast data path from source server 104 to multicast receivers like client device 106. Subsequent multicast data packets from source server 104 can be forwarded from source server 104 to RP router 108 along the SPT, and RP router 108 can forward the multicast data packets to the receivers along the RPT. Once this actual multicast data path is created, temporary tunnel 114 will be removed. For example, RP router 108 can send a register-stop message to source-side DR 110 to prevent it from unnecessarily encapsulating the data packets.

As discussed previously, when the multicast data packets are sent from the source to the receivers, each router along the SPT and the RPT needs to have its control plane protocol programming the packet-forwarding ASICs, which can lead to excessive latency, especially when multiple routers are on the path. To reduce the latency, according to some aspects of the instant application, after learning the address of client-side DR 112, source-side DR 110 can create a tunnel 116 to client-side DR 112 to allow the multicast data packets to be sent directly from source-side DR 110 to client-side DR 112. Unlike temporary tunnel 114 to RP router 108, tunnel 116 can be persistent, meaning that the tunnel will be kept alive as long as client device 106 is receiving multicast traffic from source server 104. According to further aspects, tunnel 116 can be implemented using hardware logic units (or circuits) already existing on the routers. This way, there is no longer the need for routers along the SPT and the RPT to use their control plane functions to program the hardware states of their packet-forwarding ASICs. Those control plane functions are now offloaded to the hardware logic units on source-side DR 110 and client-side DR 112 that implement hardware-based tunnel 116. Because this solution can use hardware logic units that have been traditionally used to implement temporary tunnel 114, there is no additional hardware overhead.

According to some aspects, the hardware tunnel logic (e.g., ASIC functional blocks) on source-side DR 110 can encapsulate the multicast data packets and unicast the packets over tunnel 116 to client-side DR 112, which can then use its hardware tunnel logic to decapsulate the received packets before sending them to the receivers (e.g., client device 106). Because the encapsulation and decapsulation of the multicast data packets are done by hardware components, the packet delivery process can be much faster than traditional operations.

For the above solution to work, the client-side DRs need to know the address of the source-side DR, and the source-side DR needs to know the addresses of the client-side DRs. Knowing the source address can be relatively easier. According to some aspects of the instant application, the entire network can be configured as a source-specific multicast (SSM) network, where the receivers are required to specify the source address (e.g., the IP address of the source server) when joining a multicast group. This requires the receivers or the client devices to implement Internet Group Management Protocol Version 3 (IGMPv3) or Multicast Listener Discovery Version 2 (MLDv2). When such conditions cannot be met, the receivers or clients can learn the source address through static mapping. Alternatively, a Domain Name System (DNS) server can be used to obtain the address mapping. Once the address of the source server is known, the address of the source-side DR can be determined using standard methods (e.g., by running Mtrace).

On the other hand, it can be challenging for the source-side DR to learn the addresses of the client-side DRs. According to some aspects, the source-side DR can discover a client-side DR using Simple Service Discovery Protocol (SSDP) messages or Message Queueing Telemetry Transport (MQTT) messages. Both protocols are simple and lightweight protocols that can be used as a signaling protocol for the discovery of client-side DRs. SSDP is the basis of the discovery protocol for Universal Plug and Play (UPnP) and is intended for use in residential or small office environments, and MQTT typically runs on Internet of Things (IoT) devices with limited memory and processing power. Therefore, the overhead (including both the software and hardware overhead) of both approaches can be minimal. Moreover, because the client-side DRs are discovered by the source-side DR, the source-side DR does not need to register with the RP router, and the client-side DR does not need to send join messages to the RP router on behalf of the client devices, thus reducing the bandwidth consumption.

According to some aspects, the protocol (SSDP or MQTT) used for the client discovery can run in the data plane of the routers participating in the multicast communication. To reduce the overhead, instead of including the client-discovery protocol in the network operating system (OS), each router (e.g., the source-side DR or the client-side DR) can include a dedicated Reduced Instruction Set Computer (RISC) processor for executing the client-discovery protocol. According to one aspect, the software implementing the client-discovery protocol can be part of the factory-installed software package (i.e., it can be pre-installed in the instruction memory of the RISC processor) and not included in the network OS.

Figure 2:
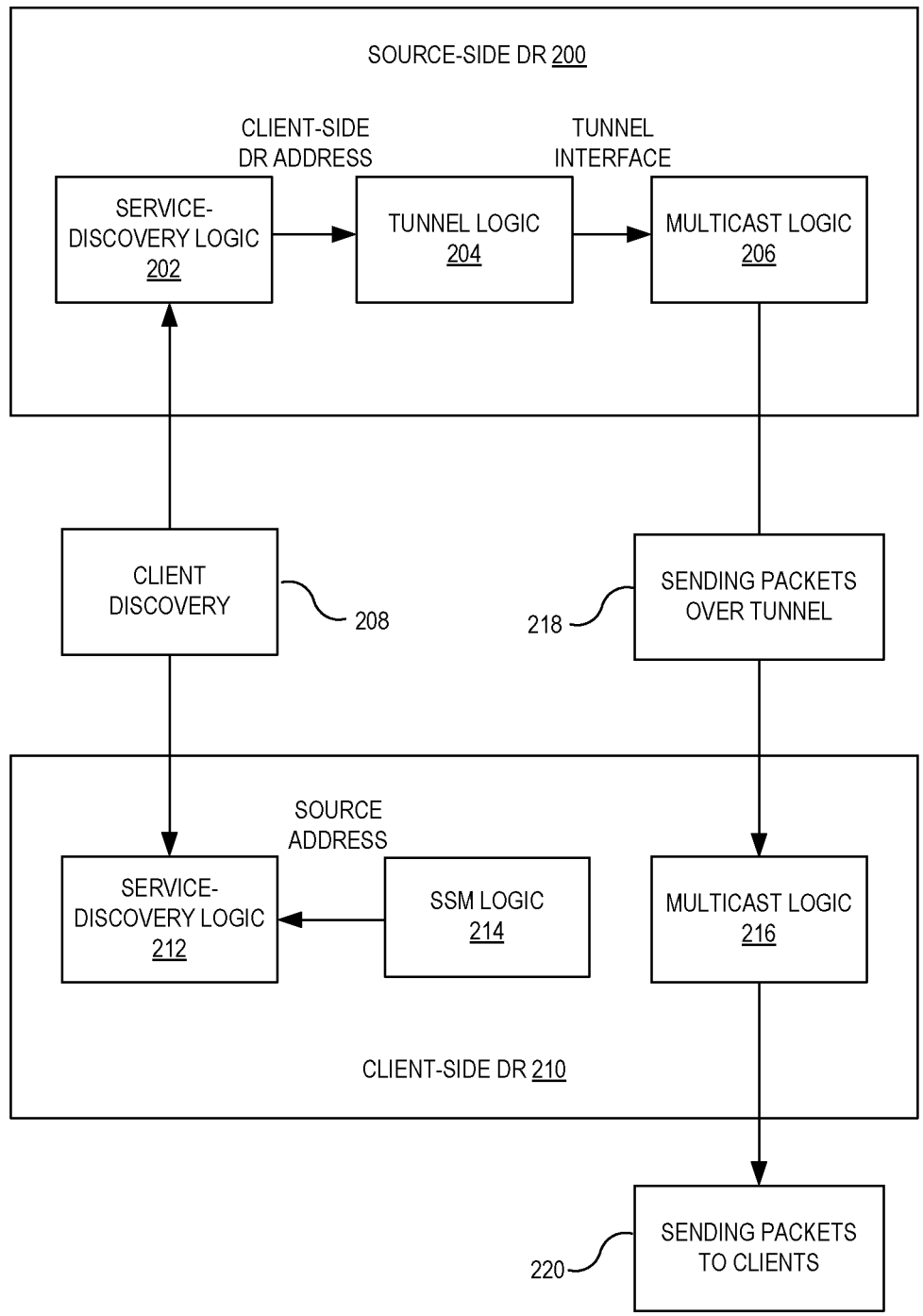
FIG. 2 illustrates an implementation example for offloading the multicast control plane functions, according to one aspect of the instant application.

FIG. 2 illustrates an implementation example for offloading the multicast control plane functions, according to one aspect of the instant application. In FIG. 2, a source-side DR 200 can include a service-discovery logic 202, a tunnel logic 204, and a multicast logic 206; a client-side DR 210 can include a service-discovery logic 212, an SSM logic 214, and a multicast logic 216.

When client devices coupled to client-side DR 210 intend to receive multicast traffic from a source device coupled to source-side DR 200, SSM logic 214 on client-side DR 210 can specify the source address and provide the source address to service-discovery logic 212, which can then interact with service-discovery logic 212 on source-side DR 200. More specifically, service-discovery logic 202 can operate in the server mode by broadcasting service-advertisement messages (which can indicate the IP address of source-side DR 200) to allow other devices on the network to know the presence of source-side DR 200. Service-discovery logic 212 can operate in the client mode by listening for service-advertisement messages and responding with a message indicating the IP address of client-side DR 210. According to some aspects, service-discovery logic 202 and service-discovery logic 212 can exchange SSDP or MQTT messages to perform a client-discovery operation 208, which allows service-discovery logic 202 to learn the address (e.g., the IP address) of client-side DR 210. Service-discovery logics 202 and 212 can include software logic units. According to one aspect, service-discovery logics 202 and 212 can run on dedicated RISC processors to minimize overhead.

Service-discovery logic 202 can provide the address of client-side DR 210 to tunnel logic 204, which can then create a persistent tunnel to client-side DR 210. According to some aspects, tunnel logic 204 can include hardware components (e.g., one or more ASIC functional blocks) designed for tunneling purposes. For example, tunnel logic 204 can be configured to create a tunnel interface, which can provide encapsulation of to-be-transmitted multicast data packets, based on the address of client-side DR 210. In one example, the tunnel can be an IP in IP tunnel, which encapsulates one IP packet in another IP packet. Tunnel logic 204 can also provide the tunnel interface to multicast logic 206, which can then create a multicast entry with the tunnel interface being the outgoing interface of the multicast data packets. For example, source-side DR 200 can also include a packet-forwarding engine (not shown in FIG. 2) that maintains a forwarding table, and multicast logic 206 can create the multicast entry in the forwarding table. Multicast logic 206 can perform operation 218, which can include sending the encapsulated multicast data packets over the created tunnel to client-side DR 210. Multicast logic 216 on client-side DR 210 can receive and decapsulate the received multicast data packets and then perform operation 220, which can include sending the multicast data packet to client devices requesting the multicast data.

When a client device coupled to client-side DR 210 leaves the multicast group, it can send a leave message to client-side DR 210. If client-side DR 210 is no longer coupled to any client device listening for the multicast data packets, client-side DR 210 can send a message to source-side DR 200, notifying tunnel logic 204 that the tunnel is no longer needed. Accordingly, tunnel logic 204 can remove the tunnel.

Figure 3:
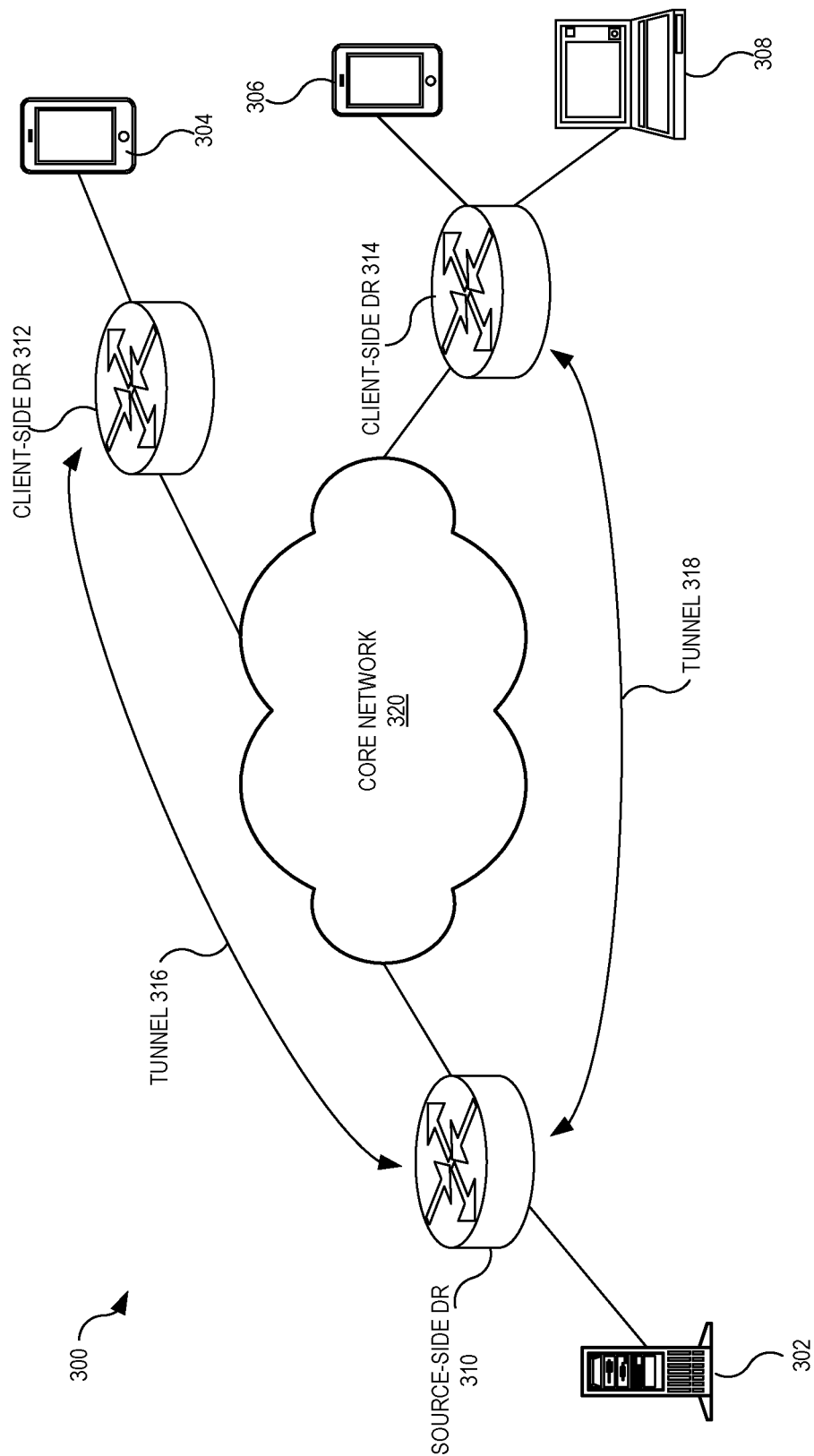
FIG. 3 illustrates an example of a multicast network comprising multiple client-side designated routers (DRs), according to one aspect of the instant application.

In the examples shown in FIGS. 1 and 2, the multicast receivers (or client devices) are coupled to one client-side DR. In practice, it is also possible that the client devices receiving the multicast traffic are located in different subnets and coupled to different client-side DRs. In such a situation, the source-side DR should create one tunnel for each client-side DR. FIG. 3 illustrates an example of a multicast network comprising multiple client-side designated routers (DRs), according to one aspect of the instant application. In FIG. 3, a multicast network 300 includes a source device 302 and a plurality of client devices 304-308 joining a particular multicast group to receive multicast traffic from source device 302. Source device 302 is coupled to a source-side DR 310, client device 304 is coupled to a client-side DR 312, and client-side devices 306 and 308 are coupled to a client-side DR 314. Moreover, source-side DR 310 and client-side DRs 312 and 314 are coupled to a core network 320.

To deliver multicast data packets to the client devices, source-side DR 310 can create, for the particular multicast group, a tunnel 316 to client-side DR 312 and a tunnel 318 to client-side DR 314. To create the tunnels, source-side DR 310 can perform the client-discovery operation (e.g., by broadcasting an advertisement message with its IP address or the IP address of source device 302). Client DRs receiving the join messages from client devices can respond to the advertisement message with their IP addresses. According to some aspects, the client-discovery operation can be performed according to the SSDP or MQTT protocol. According to further aspects, source-side DR 310 and client-side DRs 312 and 314 can each include a dedicated RISC processor running the SSDP or MQTT protocol to facilitate the client-discovery process. The tunnels can be hardware-based tunnels (i.e., they are created using hardware tunnel logic without the involvement of upper-layer software logic). In one example, the tunnels can be IP in IP tunnels.

When source device 302 transmits data packets for the particular multicast group, source-side DR 310 can forward the data packets to client-side DRs 312 and 314 over tunnels 316 and 318, respectively. By creating the hardware-based tunnels to directly transmit multicast data packets to the DRs, the multicast control plane functions of programming the packet-forwarding ASIC on each router along the multicast path is now offloaded to the hardware tunnel logic, which can significantly reduce the packet-transmission latency. Upon receiving the multicast data packets, each client-side DR can use its own hardware tunnel logic to decapsulate the packets. The decapsulated packets can then be forwarded to the client devices in the multicast group. For example, client-side DR 312 can forward packets received via tunnel 316 to client device 304, and client-side DR 314 can forward packets received via tunnel 318 to client devices 306 and 308.

Because creating the hardware-based tunnel can occupy hardware resources (e.g., ASCI functional blocks), there can be a limit (or threshold) on the total number of tunnels supported by the source-side DR, depending on the hardware resources available on the source-side DR. According to some aspects, if the total number of client-side DRs equals to or exceeds the tunnel threshold, the multicast data forwarding tunnel to a newly discovered client-side DR cannot be established. In such a situation, multicast data forwarding to the newly discovered client-side DR will rely on the traditional method of forwarding packets along the SPT and the RPT. For example, if the source-side DR can support up to 10 tunnels, then when client devices coupled to the 11th client-side DR join the multicast group, the source-side DR would rely on the RP router to establish a multicast path comprising the SPT and the RPT, and the multicast data packets can be transmitted along the SPT and the RPT to the 11th client-side DR.

Figure 4A:
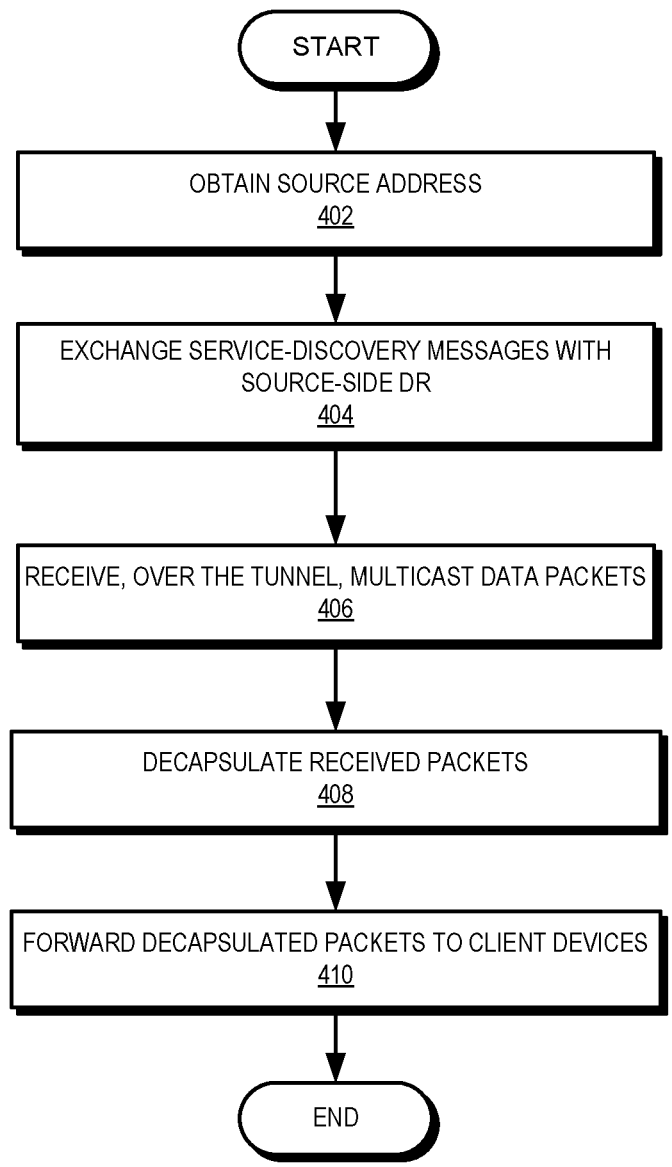
FIG. 4A presents a flowchart illustrating an operation example of a client-side designated router (DR) forwarding multicast traffic, according to one aspect of the instant application.

FIG. 4A presents a flowchart illustrating an operation example of a client-side designated router (DR) forwarding multicast traffic, according to one aspect of the instant application. During operation, a client-side DR coupled to one or more client devices belonging to a multicast group can obtain the source address of the multicast group (operation 402). According to some aspects, the source address can be the IP address of the source device, and the client-side DR can receive an SSM join message from a client device subscribing to the multicast group, with the SSM join message specifying the source address of the multicast group. According to alternative aspects, the client-side DR can obtain the source address based on a static mapping table or by querying a DNS server.

The client-side DR can exchange service-discovery messages with the source-side DR to allow the source-side DR to discover the client-side DR (operation 404). According to some aspects, the client-side DR can listen for advertisement messages indicating the source address and send a response message indicating the address of the client-side DR. The service-discovery messages can include SSDP or MQTT messages. According to some aspects, the client-side DR can include a RISC processor that runs the SSDP or MQTT protocol. Once the source-side DR discovers the client-side DR, it can create a tunnel (e.g., an IP in IP tunnel) to the client-side DR to send the multicast data packets from the source device to the client-side DR. To minimize latency, the tunnel can be created using hardware components (e.g., ASIC functional blocks).

The client-side DR can receive, over the tunnel, the multicast data packets (operation 406). The client-side DR can decapsulate the received packets (operation 408). According to some aspects, packet decapsulation can be performed by hardware components within the client-side DR. The client-side DR can then forward the decapsulated multicast data packets to coupled client devices belonging to the multicast group (operation 410).

Figure 4B:
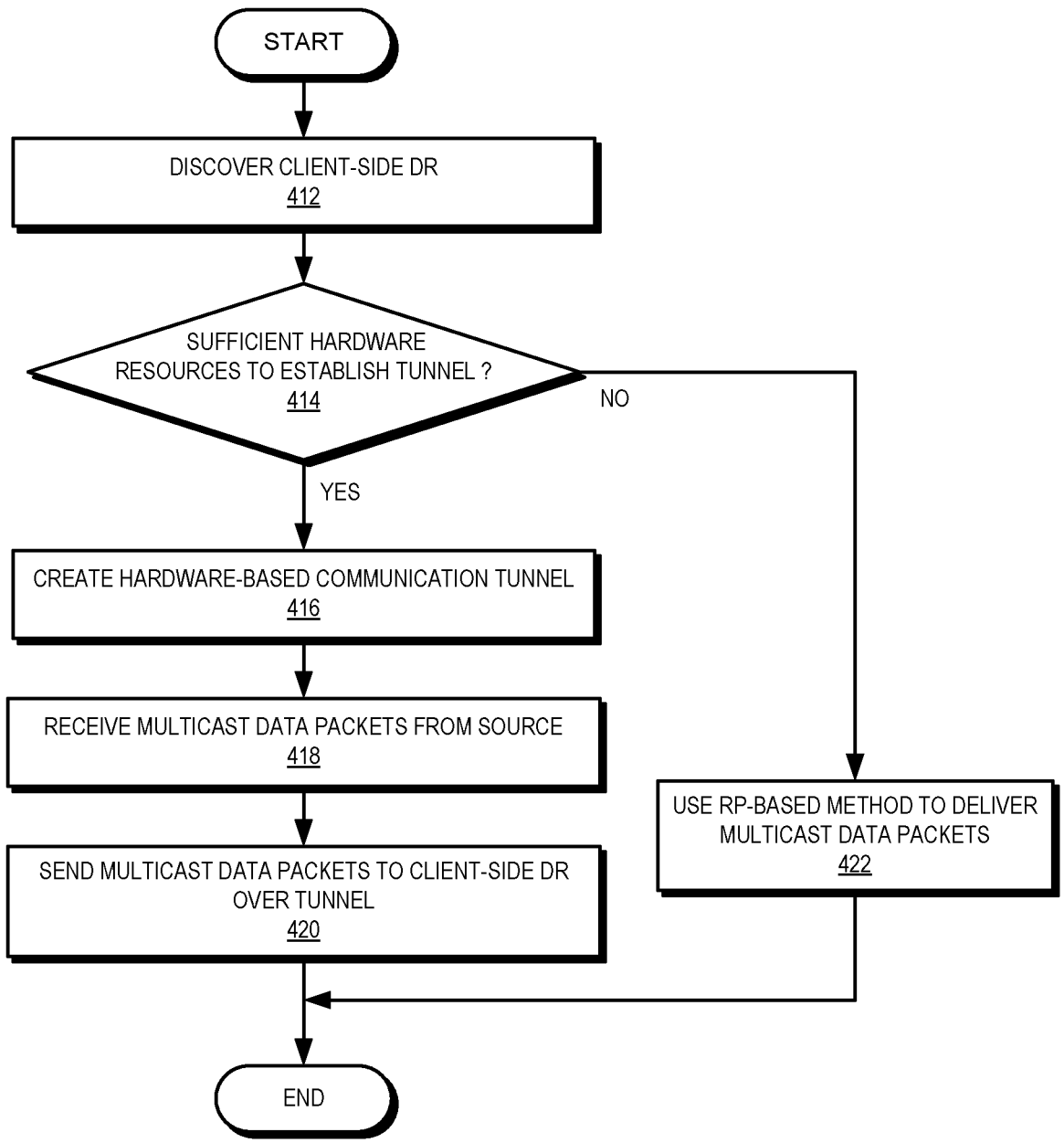
FIG. 4B presents a flowchart illustrating an operation example of a source-side designated router (DR) forwarding multicast traffic, according to one aspect of the instant application.

FIG. 4B presents a flowchart illustrating an operation example of a source-side designated router (DR) forwarding multicast traffic, according to one aspect of the instant application. During operation, a source-side DR can discover a client-side DR, which is coupled to one or more client devices belonging to a multicast group (operation 412). According to some aspects, the source-side DR can periodically send out advertisement messages indicating the source address and receive, from a client-side DR listening for such advertisement messages, a response message indicating the address of the client-side DR. According to some aspects, the source-side DR can include a RISC processor that runs a service-discovery protocol (e.g., SSDP or MQTT).

The source-side DR can determine whether it has sufficient hardware resources to establish a hardware-based communication tunnel to the discovered client-side DR (operation 414). According to some aspects, establishing a hardware-based communication tunnel may require a certain number of specifically designed ASIC functional blocks. Depending on the hardware resources allocated for tunneling purposes, the source-side DR may support a predetermined maximum number of hardware-based communication tunnels. Determining whether there are sufficient hardware resources can include determining whether the total number of discovered client-side DRs in the multicast network exceeds the predetermined maximum number.

If there are sufficient hardware resources, the source-side DR can create a hardware-based communication tunnel to the client-side DR (operation 416). According to some aspects, the source-side DR can configure a tunnel interface and create a multicast entry in the packet-forwarding table to specify the tunnel interface as an outgoing interface of the multicast data packets for the particular multicast group.

The source-side DR can receive, from the source device, the multicast data packets for the particular multicast group (operation 418) and send, over the communication tunnel, the multicast data packets to the client-DR (operation 420). The client-side DR can then decapsulate the received packets and forward the decapsulated multicast data packets to coupled client devices belonging to the multicast group.

If the source-side DR lacks hardware resources for establishing a communication tunnel to the newly discovered client-side DR, the source-side DR can use the RP-based method to deliver the multicast data packets to the client-side DR (operation 422). The RP-based method can include the source-side DR registering with the RP, which can forward the initial multicast data packet to the client-side DR. The RP-based method can also include the control plane of each router on the multicast path configuring its packet-forwarding hardware.

Figure 5:
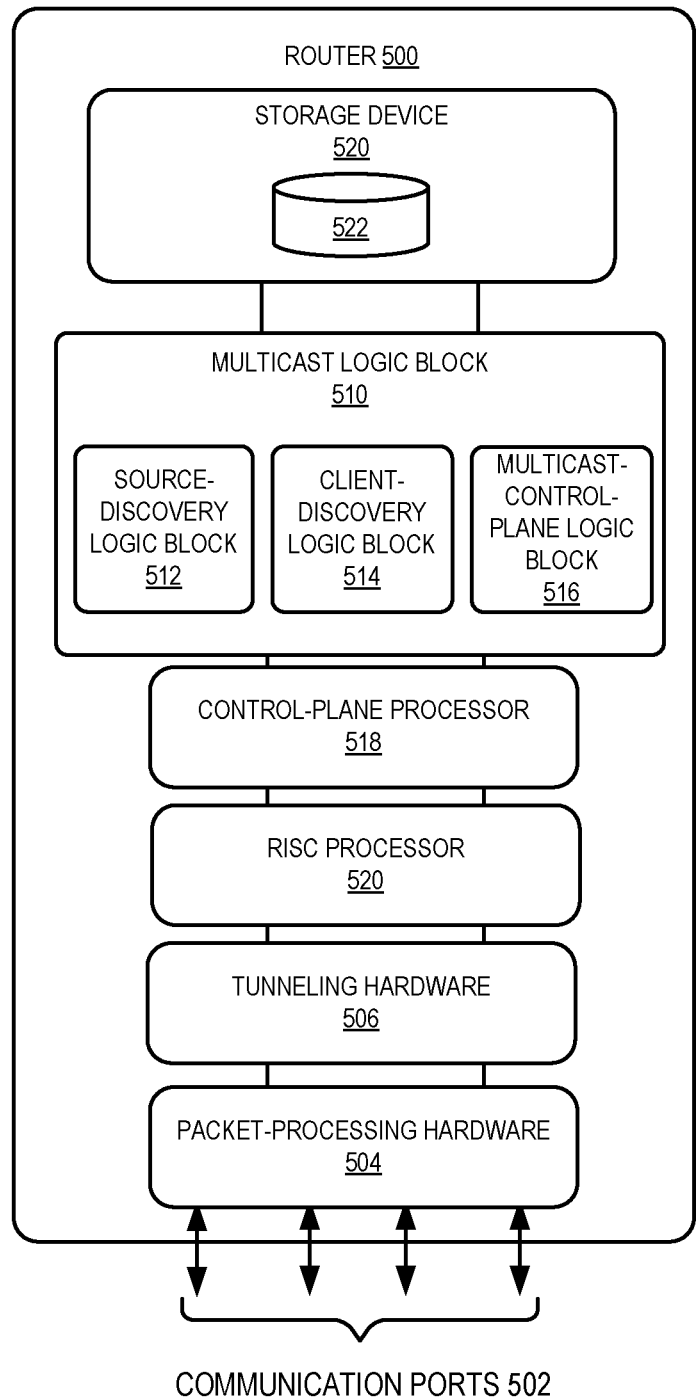
FIG. 5 illustrates an example of a router supporting tunnel-based multicasting, according to one aspect of the present application.

FIG. 5 illustrates an example of a router supporting tunnel-based multicasting, according to one aspect of the present application. Depending on whether it is coupled to a source device sending multicast traffic or a client device receiving the multicast traffic, the router can function as a source-side DR or a client-side DR, respectively. In this example, a router 500 can include a number of communication ports 502, packet-processing hardware 504, tunneling hardware 506, and a storage device 520. Both packet-processing hardware 504 and tunneling hardware 506 can include application-specific integrated circuit (ASIC) chips. Packet-processing hardware 504 can perform a standard packet-processing function by extracting and processing header information from received packets. Packet-processing hardware 504 can determine which communication port to forward the received packets. Tunneling hardware 506 can perform the function of creating communication tunnels, including encapsulating and/or decapsulating packets.

Communication ports 502 can include external communication channels for communicating with other routers, switches, and/or user devices. According to one aspect, communication ports 502 can include at least a port for communicating with a source/client device and a port for communicating with a multicast network. The communication channels can be implemented via a regular communication port and based on any open or proprietary format. Communication ports 502 can include one or more Ethernet ports capable of receiving frames encapsulated in an Ethernet header. Communication ports 502 can also include one or more IP ports capable of receiving IP packets. An IP port is capable of receiving an IP packet and can be configured with an IP address. A respective port of communication ports 502 may operate as an ingress port and/or an egress port.

Router 500 can maintain a database 522 (e.g., in storage device 520). Database 522 can be a relational database and may run on one or more Database Management System (DBMS) instances. Database 552 can store information associated with the routing, configuration, and interfaces of router 500. Router 500 can include a multicast logic block 510 that can allow router 500 to facilitate multicast communications.

Multicast logic block 510 can include a source-discovery logic block 512, a client-discovery logic block 514, and a multicast-control-plane logic block 516. If router 500 is a client-side router, source-discovery logic block 512 can perform the discovery operation of a source-side DR. If router 500 is a source-side DR, client-discovery logic block 514 can perform the discovery operation of one or more client-side DRs. Multicast-control-plane logic block 518 can execute various control plane functions related to multicast (e.g., protocol-related functions).

Router 500 can further include a control-plane processor 518 for executing the control-plane software and a RISC processor 520 for executing the protocol for discovering client DRs.

In general, the proposed solution extends the conventional multicast approach that relies on a temporary tunnel to the RP router by creating a persistent tunnel to the client-side DR. The source-side DR can learn the address of the client-side DR by executing a lightweight service-discovery protocol (e.g., SSDP or MQTT) on a dedicated RISC processor. Once the address of the client-side DR is known to the source-side DR, the source-side DR can create a persistent tunnel to the client-side DR and forward multicast data packets to the client-side DR over the tunnel. Upon receiving the multicast data packets, the client-side DR can decapsulate the packets and forward the packets to coupled client devices in the corresponding multicast group. The tunnel is persistent as long as a client device coupled to the client-side DR is requesting multicast data packets. The tunnel between the source-side DR and the client-side DR can be implemented using hardware components (e.g., ASIC functional blocks). This approach achieves the goal of offloading the control-plane function of programming the packet-forwarding hardware to the hardware tunnel logic, thus reducing latency. In addition, because the hardware tunnel logic is already included in most routers, the overhead of this approach is minimal.

One aspect of the instant application can provide a system and method for tunnel-based multicasting. During operation, a source-side designated router (DR) coupled to a source device of a multicast group can broadcast a service-advertisement packet and receive a response packet to the service-advertisement packet from a client-side DR coupled to one or more client devices within the multicast group. The source-side DR can determine an address of the client-side DR based on the received response packet and establish a hardware-based communication tunnel between the source-side DR and the client-side DR using the address of the client-side DR. Establishing the hardware-based communication tunnel can include using hardware logic units within the source-side DR to encapsulate multicast data packets originating from the source device. The source-side DR can further send, over the hardware-based communication tunnel, multicast data packets originating from the source device to the client-side DR, which forwards the multicast data packets to the one or more client devices within the multicast group.

According to one variation on this aspect, the client-side DR can determine an address of the source-side DR.

According to a further variation, the address of the source-side DR is determined based on a source-specific multicast (SSM) join message from a client device or based on a Domain Name System (DNS) mapping table.

According to one variation on this aspect, the service-advertisement packet and the response packet each can include a Simple Service Discovery Protocol (SSDP) packet or a Message Queuing Telemetry Transport (MQTT) packet.

According to a further aspect, a Reduced Instruction Set Computer (RISC) processor on the client-side DR can process the service-advertisement packet, and a RISC processor on the source-side DR can process the response packet.

According to one variation on this aspect, the hardware logic units can include application-specific integrated circuit (ASIC) functional blocks.

According to one variation on this aspect, the source-side DR can create a multicast entry in a forwarding table associated with the source-side DR, the multicast entry specifying the hardware-based communication tunnel as an outgoing interface for the multicast data packets.

According to one variation on this aspect, in response to determining that hardware resources on the source-side DR are not sufficient to establish the communicate tunnel, the source-side DR can send the multicast data packets to a Rendezvous Point (RP) router, which forwards the multicast data packets to the client-side DR.

One aspect of the instant application can provide a system and method for tunnel-based multicasting. During operation, a client-side designated router (DR) coupled to one or more client devices within a multicast group can determine an address of a source-side DR coupled to a source device of the multicast group. In response to receiving, from the source-side DR, a service-advertisement packet, the client-side DR can transmit a response packet to the source-side DR to allow the source-side DR to discover the client-side DR and establish a hardware-based communication tunnel to the client-side DR. The client-side DR can receive, from the source-side DR over the hardware-based communication tunnel, multicast data packets originating from the source device. Receiving the multicast data packets over the hardware-based tunnel can include using hardware logic units within the client-side DR to decapsulate the multicast data packets. The client-side DR can further forward the multicast data packets to the one or more client devices within the multicast group.

According to one variation on this aspect, the address of the source-side DR can be determined based on a source-specific multicast (SSM) join message from a client device or based on a Domain Name System (DNS) mapping table.

According to one variation on this aspect, the service-advertisement packet and the response packet can each include a Simple Service Discovery Protocol (SSDP) packet or a Message Queuing Telemetry Transport (MQTT) packet.

According to a further variation, a Reduced Instruction Set Computer (RISC) processor on the client-side DR can process the service-advertisement packet, and a RISC processor on the source-side DR can process the response packet.

According to one variation on this aspect, the client-side DR can decapsulate, using hardware logic units within the client-side DR, the received multicast data packets.

According to one variation on this aspect, the client-side DR can receive the multicast data packets from a Rendezvous Point (RP) router, in response to the source-side DR not having sufficient hardware resources to establish the hardware-based communication tunnel.

The above description is presented to enable any person skilled in the art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be, for example, Random Access Memory (RAM), non-volatile RAM (NVRAM), an Electrically Erasable Programmable Read-Only Memory (EEPROM), a storage device, an optical disc, and the like. The computer-readable storage medium may be a non-transitory storage medium, where the term "non-transitory" does not encompass transitory propagating signals.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:
    broadcasting, by a source-side designated router (DR) coupled to a source device of a multicast group, a service-advertisement packet;
    receiving a response packet to the service-advertisement packet from a client-side DR coupled to one or more client devices within the multicast group;
    determining, by the source-side DR, an address of the client-side DR based on the received response packet;
    establishing a hardware-based communication tunnel between the source-side DR and the client-side DR using the address of the client-side DR, wherein establishing the hardware-based communication tunnel comprises using hardware logic units within the source-side DR to encapsulate multicast data packets originating from the source device;
    sending, by the source-side DR over the hardware-based communication tunnel, the multicast data packets originating from the source device to the client-side DR, which forwards the multicast data packets to the one or more client devices within the multicast group.

2. The method of claim 1, further comprising determining, by the client-side DR, an address of the source-side DR.

3. The method of claim 2, wherein the address of the source-side DR is determined based on a source-specific multicast (SSM) join message from a client device or based on a Domain Name System (DNS) mapping table.

4. The method of claim 1, wherein the service-advertisement packet and the response packet each comprise a Simple Service Discovery Protocol (SSDP) packet or a Message Queuing Telemetry Transport (MQTT) packet.

5. The method of claim 4, further comprising:
    processing, by a Reduced Instruction Set Computer (RISC) processor on the client-side DR, the service-advertisement packet; and
    processing, by a RISC processor on the source-side DR, the response packet.

6. The method of claim 1, wherein the hardware logic units comprise application-specific integrated circuit (ASIC) functional blocks.

7. The method of claim 1, further comprising:
    creating a multicast entry in a forwarding table associated with the source-side DR, wherein the multicast entry specifies the hardware-based communication tunnel as an outgoing interface for the multicast data packets.

8. The method of claim 1, further comprising:
    in response to determining that hardware resources on the source-side DR are not sufficient to establish the communicate tunnel, sending the multicast data packets to a Rendezvous Point (RP) router, which forwards the multicast data packets to the client-side DR.

9. A source-side designated router (DR) of a multicast group, comprising:
    a client-discovery unit to determine an address of a client-side DR coupled to one or more client devices within the multicast group;
    a tunneling unit to establish a hardware-based communication tunnel between the source-side DR and the client-side DR, wherein the tunneling logic is to use hardware logic units within the source-side DR to encapsulate multicast data packets for the multicast group; and
    a packet-transmission unit to transmit, over the hardware-based communication tunnel, the multicast data packets for the multicast group to the client-side DR, which forwards the multicast data packets to the one or more client devices within the multicast group.

10. The source-side DR of claim 9, wherein the client-discovery unit determines the address of the client-side DR based on a Simple Service Discovery Protocol (SSDP) protocol or a Message Queuing Telemetry Transport (MQTT) protocol.

11. The source-side DR of claim 10, wherein the client-discovery unit comprises a Reduced Instruction Set Computer (RISC) processor to execute the SSDP or MQTT protocol.

12. The source-side DR of claim 9, wherein the hardware logic units comprise application-specific integrated circuit (ASIC) functional blocks.

13. The source-side DR of claim 9, further comprising:
    a packet-forwarding engine to maintain a forwarding table; and
    a multicast logic to create a multicast entry in the forwarding table, wherein the multicast entry specifies the hardware-based communication tunnel as an outgoing interface for the multicast data packets.

14. The source-side DR of claim 9,
    wherein the tunneling unit is to determine whether there are sufficient hardware resources on the source-side DR to establish the hardware-based communicate tunnel; and
    wherein the packet-transmission unit is to send the multicast data packets to a Rendezvous Point (RP) router, in response to the tunnelling unit determining that there are not sufficient hardware resources.

15. A method comprising:
    determining, by a client-side designated router (DR) coupled to one or more client devices within a multicast group, an address of a source-side DR coupled to a source device of the multicast group;
    in response to receiving, from the source-side DR, a service-advertisement packet, transmitting a response packet to the source-side DR to allow the source-side DR to discover the client-side DR and establish a hardware-based communication tunnel to the client-side DR;
    receiving, from the source-side DR over the hardware-based communication tunnel, multicast data packets originating from the source device, wherein receiving the multicast data packets over the hardware-based tunnel comprises using hardware logic units within the client-side DR to decapsulate the multicast data packets; and forwarding the multicast data packets to the one or more client devices within the multicast group.

16. The method of claim 15, wherein the address of the source-side DR is determined based on a source-specific multicast (SSM) join message from a client device or based on a Domain Name System (DNS) mapping table.

17. The method of claim 15, wherein the service-advertisement packet and the response packet each comprises a Simple Service Discovery Protocol (SSDP) packet or a Message Queuing Telemetry Transport (MQTT) packet.

18. The method of claim 17, further comprising:
processing, by a Reduced Instruction Set Computer (RISC) processor on the client-side DR, the service-advertisement packet; and
processing, by a RISC processor on the source-side DR, the response packet.

19. The method of claim 15, wherein the hardware logic units comprise application-specific integrated circuit (ASIC) functional blocks.

20. The method of claim 15, further comprising receiving the multicast data packets from a Rendezvous Point (RP) router, in response to the source-side DR not having sufficient hardware resources to establish the hardware-based communication tunnel.

* * * * *